United States Patent [19]

Lauton et al.

[11] Patent Number: 4,514,186
[45] Date of Patent: Apr. 30, 1985

[54] AQUEOUS FORMULATIONS OF WATER-INSOLUBLE OR SPARINGLY WATER-SOLUBLE DYES AND HYPOPHOSPHITE/UNSATURATED ACID TELDMER

[75] Inventors: Alain Lauton, Saint-Louis, France; Zdenek Koci, Binningen, Switzerland

[73] Assignee: Ciba Geigy Corporation, Ardsley, N.Y.

[21] Appl. No.: 545,416

[22] Filed: Oct. 25, 1983

[30] Foreign Application Priority Data

Apr. 11, 1982 [CH] Switzerland ............ 6415/82

[51] Int. Cl.³ .............. C09B 67/40; D06P 1/52
[52] U.S. Cl. ............................ 8/527; 8/584; 8/587; 8/532; 8/918; 8/922; 210/699; 210/700
[58] Field of Search .................... 8/527, 584

[56] References Cited

U.S. PATENT DOCUMENTS

| | | | |
|---|---|---|---|
| 2,957,931 | 10/1960 | Hamilton et al. | 204/159.22 |
| 3,139,321 | 6/1964 | Clapp et al. | 8/555 |
| 3,484,180 | 12/1969 | Humphreys et al. | 8/562 |
| 4,046,707 | 9/1977 | Smith et al. | 252/180 |
| 4,105,551 | 8/1978 | Smith et al. | 210/700 |
| 4,127,483 | 11/1978 | Smith et al. | 210/699 |
| 4,159,946 | 7/1979 | Smith et al. | 210/699 |
| 4,297,100 | 10/1981 | Koci et al. | 8/527 |

Primary Examiner—A. Lionel Clingman
Attorney, Agent, or Firm—Edward McC. Roberts; Kevin T. Mansfield

[57] ABSTRACT

The invention relates to aqueous dyestuff formulations which contain at least one telomer of the formula I

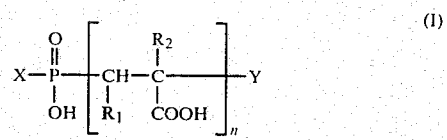

or a salt thereof, in addition to at least one anionic dispersant and optionally further ingredients. In formula I the symbols have the following meanings: X is hydrogen or

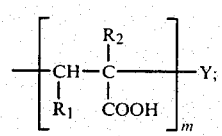

Y is hydrogen, —SO₄H or

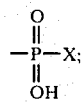

each of $R_1$ and $R_2$ independently of the other is hydrogen, $C_1$-$C_4$ alkyl which is unsubstituted or substituted by a carboxyl group or is carboxyl; and the sum of $n+m$ is an integer from 2 to 350. These compositions have good storage stability and redispersibility and are particularly suitable for use in the continuous dyeing process.

8 Claims, No Drawings

AQUEOUS FORMULATIONS OF WATER-INSOLUBLE OR SPARINGLY WATER-SOLUBLE DYES AND HYPOPHOSPHITE/UNSATURATED ACID TELDMER

The present invention relates to aqueous formulations of water-insoluble or sparingly water-soluble dyes, to a process for their preparation, and to the use thereof for dyeing textile materials.

When dyeing textile materials by the continuous process with dyes which are insoluble or sparingly soluble in water, unlevel dyeings are often obtained. The cause of these unlevel dyeings is, among other things, that the dyes migrate on the textile material when the impregnated and pinched-off textile material is dried. To overcome this drawback it has already been proposed to add special migration inhibitors to the padding liquor.

These migration inhibitors are in particular high molecular water-soluble polymers which as a rule cannot be used for the preparation of liquid formulations because they cause agglomeration, so that unstable formulations are obtained. With the great majority of dyes, such formulations also cannot be used on account of their high viscosity.

It is also known to add specific migration inhibitors during the preparation of liquid dyestuff formulations. Such formulations are described e.g. in U.S. Pat. No. 3,484,180 (methyl cellulose) and U.S. Pat. No. 3,139,321 (mixtures of monomeric and polymeric quaternary salts of dialkylaminoacryloacrylates), as well as in German patent specification No. 1 290 521 (tetraalkylbutine-1,4-diols).

However, the shortcoming of the formulations so obtained is that their storage and temperature stability is insufficient for actual practice and that they cannot be redispersed.

In German Auslegeschrift No. 2 816 539 it is also taught to use polycarboxylates for the preparation of liquid dyestuff formulations of low migration tendency. However, in this case special redispersibility improvers are required in order to ensure good storage stability of the liquid formulation and, in particular, its redispersibility.

Accordingly, it is the object of the present invention to provide aqueous formulations of water-insoluble or sparingly water-soluble dyes, which formulations have, on the one hand, good storage stability and redispersibility and, on the other, give dyeings which are substantially stable to migration during the intermediate drying step.

Surprisingly, it has been found that liquid formulations which do not have the shortcomings referred to above are obtained by adding a telomer of the formula I

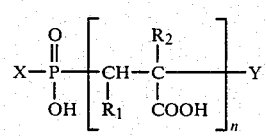

(I)

or a salt thereof, wherein X is hydrogen or

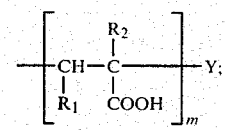

Y is hydrogen —SO$_4$H or

each of R$_1$ and R$_2$ independently is hydrogen, C$_1$–C$_4$alkyl which is unsubstituted or substituted by a carboxyl group or is the carboxyl group; and the sum of the indices n+m is an integer from 2 to 350.

Accordingly, the present invention relates to aqueous dyestuff formulations which contain at least one telomer of the formula I in addition to water, at least one water-insoluble or sparingly water-soluble dye, an anionic dispersant, and optionally further ingredients.

Compared with liquid formulations which do not contain a telomer of the formula I, the formulations of the present invention have better stability without increased migration of the dye on the still moist impregnated fabric being caused by the addition of said telomer. In addition, the formulations have good redispersibility, so that it is not necessary to add fairly expensive redispersibility improvers. Further, the telomers employed in the practice of this invention have good complexing properties, so that hard water may also be readily used for preparing the novel formulations.

The telomers of the formula I may also be used in the form of their salts, e.g. the alkali metal salt, ammonium salt or mono-, di- or tri(hydroxyethyl)ammonium or mono-, di- or tri(hydroxypropyl)ammonium salt.

Preferred telomers of the formula I are those in which X and Y have the given meanings and each of the radicals R$_1$ and R$_2$ independently of the other is hydrogen or methyl, and the sum of n+m is an integer from 5 to 70.

The liquid formulations preferably contain the telomers in a concentration of 0.5 to 30% by weight, based on the final formulation.

The telomers employed in the practice of this invention are polymers of hypophosphorous acid and α,β-unsaturated carboxylic acids. Such polymers are known or they can be prepared by known methods, e.g. as described in U.S. Pat. No. 2,957,931. The usual procedure is that hypophosphorous acid or a water-soluble salt thereof as telogen is telomerised together with an α,β-unsaturated mono-, di- or tricarboxylic acid. Mixtures of different carboxylic acids can also be used. For example, in the preparation of hypophosphite/acrylate telomers, acrylic acid can be partly replaced by methacrylic, maleic or itaconic acid. The reaction is initiated by an initiator, e.g. peroxodisulfate.

The molecular weight of the telomers for the preparation of the formulations of this invention varies from 200 to 50,000, with about 5 to 20 moles of α,β-unsaturated carboxylic acid being used per 1 mole of hypophosphite.

The water-insoluble or sparingly water-soluble dyes contained in the liquid formulations are those having a water-solubility of less than 1 g/l at a temperature of 20°

C. Such dyes are in particular disperse dyes, vat dyes, sulfur dyes and pigment dyes, which belong chemically to a very wide range of classes.

The disperse dyes are e.g. nitro, aminoketone, ketoneimine, methine, polymethine, diphenylamine, quinoline, benzimidazole, xanthene, oxazine, aminonaphthoquinone or coumarin dyes which do not contain carboxylic acid and/or sulfonic acid groups, and are especially anthraquinone and azo dyes such as mono- or disazo dyes. The vat dyes are dyes which are applied in solid, dispersed form to the fabric and, after development, are again present in water-insoluble form.

In addition to individual dyes, the formulations of this invention may also contain mixtures of dyes which can also be combinations of water-insoluble or sparingly water-soluble dyes with water-soluble dyes if it is desired to dye blended fabrics made e.g. of polyester/cotton.

The formulations will preferably contain a vat, sulfur, pigment or disperse dye.

In addition to the telomer of the formula I, the aqueous dyestuff formulations contain an anionic dispersant as further surface-active substance.

Suitable anionic dispersants are in particular lignosulfonates, e.g. those obtained by the sulfite or kraft process. They are preferably products which are partially hydrolysed, oxidised or desulfonated or, if they have been obtained by the kraft process, are postsulfonated or sulfomethylated, and are fractionated by known methods, e.g. according to molecular weight or degree of sulfonation. Mixtures of sulfite- and kraft-lignosulfonates are also very effective. Particularly suitable lignosulfonates are those having an average molecular weight from 1000 to 80,000, an active lignosulfonate content of at least 80% and preferably a low content of polyvalent cations.

In addition to lignosulfonates, suitable anionic surfactants are also condensates of aromatic sulfonic acids and formaldehyde, e.g. condensates of formaldehyde and naphthalenesulfonic acids or alkylnaphthalenesulfonic acids, e.g. the disodium salt of di-(6-sulfonaphth-2-yl)-methane, or of formaldehyde, naphthalenesulfonic acid and benzenesulfonic acid, or a condensate of crude cresol, formaldehyde and naphthalenesulfonic acid. Further anionic dispersants are sulfated alkylene oxide adducts, sulfated, partially esterified polyhydric alcohols, alkylsulfonates, sodium dialkylsulfonsuccinates, alkylbenzenesulfonates, condensates of ditolyl ether, formaldehyde and sulfuric acid, condensates of chloromethylolated diphenyls, naphthaline and sulfuric acid of monocyclic aromatic compounds, formaldehyde, naphtholsulfonic acids and optionally sodium sulfite, or condensates of naphthalene, toluene, formaldehyde and sulfuric acid.

The anionic dispersants are usually present in the form of their alkali metal salts, ammonium salts or water-soluble amine salts.

The further ingredients which may be present in the liquid formulations are in particular preservatives such as pentachlorophenolate, formalin, chloroacetamide and N-hydroxymethylchloroacetamide; antifreeze agents such as ethylene glycol, glycerol, sorbitol or propylene glycol; and antifoams, thickeners, or assistants which improve the application properties of the dyestuff formulations.

In addition to water as dispersing medium, the dyestuff formulations of this invention preferably contain 5 to 50% by weight, in particular 15 to 30% by weight, of at least one water-insoluble or sparingly water-soluble dye, 0.1 to 20% by weight, in particular 0.5 to 3% by weight, of an anionic dispersant, 0.5 to 30% by weight, in particular 10 to 20% by weight, of a telomer of the formula I, and optionally further ingredients in an amount of 0.1 to 30% by weight, the percentage amounts being in each case based on the final formulation.

The preparation of the novel aqueous dyestuff formulations is accomplished e.g. by stirring the water-insoluble or sparingly water-soluble dye, or a mixture containing such dyes, optionally in combination with water-soluble dyes, into an aqueous solution which already contains the telomer of the formula I and an anionic dispersant as well as optionally further ingredients which, if required, may also be added to the liquid formulation at the conclusion of the preparation procedure. The mixture is homogenised at room temperature for about 10 to 30 minutes and subsequently ground until a dispersion having an average particle size of less than 10 μm, preferably of less than 2 μm, is obtained. After the desired particle size has been obtained, the grinding elements are removed and, if desired, the tinctorial strength of the liquid formulation is adjusted to the required value.

The dyestuff dispersion so obtained is very readily flowable and redispersible and can be stored unchanged over several months in the temperature range from $-10°$ to $+50°$ C. When used in particular in the continuous dyeing process, the dyes in the dyestuff formulations of this invention have only an insignificant migration tendency which can be still further reduced by the addition of conventional electrolytes such as Glauber's salt or sodium chloride to the padding liquor. The padding liquors prepared with the novel liquid formulations are stable and no precipitations form.

The liquid formulations, optionally after dilution with water, are used in particular in the continuous dyeing process (pad process) for textile materials which can be dyed with water-insoluble dyes. Depending on the nature of the dyes contained in the formulations, it is possible to dye e.g. cellulose, polyester or also polyester/cotton blends. Following the impregnating and pinching-off procedure, the textile material is subjected to an intermediate drying, e.g. for 2 to 3 minutes at 100° to 120° C.

The following Examples illustrate the invention without implying any limitation to what is described therein. Parts are by weight. The individual tests, viz. the migration, storage stability and redispersibility test, were each carried out in accordance with the particulars given in German Auslegeschrift No. 2 816 539.

EXAMPLE 1

19.2 parts of the dry dye of the formula

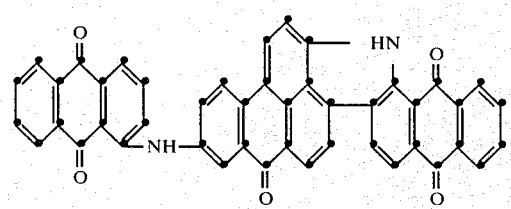

are slowly and intensively stirred into 30.8 parts of water containing 2.6 parts of an oxylignosulfonate (0.2 sulfonate groups per coniferyl alcohol unit, mol. wt. <40,000), 30 parts of a 43% aqueous solution of a telomer of sodium hypophosphite and acrylic acid (mol. wt. about 1000), 0.4 part of formaldehyde in the form of a 37% aqueous solution and 17 parts of glycerol, and the mixture is homogenised for about 20 minutes at room temperature. The resultant dye suspension is ground in an open mill for 24 hours with 200 parts of siliquarzite balls (diameter: 3 mm) until the dye has an average particle size of about 1 μm. After removal of the grinding balls there is obtained a dyestuff formulation which has very good storage stability over 2 months at −10° C., +40° C. and +50° C. and which is readily redispersible. Two strips of cotton fabric are padded with a liquor containing 40 g/l of the above dyestuff formulation with the addition of 5 g/l of Glauber's salt and 2 ml/l of 80% acetic acid in accordance with the migration test, and the strips are then dried for 3 minutes at 120° C. The dyeing obtained is level and has a migration rating of 4. If a liquid formulation without the addition of the telomer of this invention is used instead of the above formulation, the dyestuff formulation so obtained is unstable and gives an unstable padding liquor when electrolyte is added.

EXAMPLE 2

22 parts of the dry dye of the formula

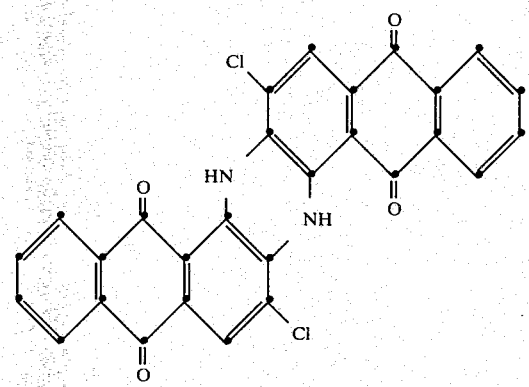

are intensively stirred into a mixture of 1.1 parts of an anionic dispersant (condensate of formaldehyde with the sodium salt of naphthalenesulfonic acid), 27 parts of a 43% aqueous solution of a telomer of sodium hypophosphite and acrylic acid (mol. wt. about 2000), 0.4 part of formaldehyde in the form of a 37% aqueous solution, 22 parts of a 70% aqueous solution of sorbitol and 27.5 parts of water, and the mixture is homogenised for about 20 minutes at room temperature. The resultant dye suspension is then ground for 20 hours with 200 parts of siliquarzite balls (diameter: 3 mm) until the dye has an average particle size of about 1 μm. After removal of the grinding balls there is obtained a liquid dyestuff formulation with very good storage stability (2 months at +40° C., +50° C. and −10° C.) and which is readily redispersible. When using this dyestuff formulation for padding a cotton fabric in a concentration of 40 g/l of padding liquor with the addition of 5 g/l of Glauber's salt and 2 ml/l of 80% acetic acid, the levelly dyed cotton fabric has a migration rating of 4 in the migration test after an intermediate drying for 3 minutes at 120° C.

By using equal parts of a 43% solution of a telomer of sodium hypophosphite and a mixture of acrylic acid and methacrylic acid in the ratio of 70:30 (mol. wt. about 2000) instead of the above telomer, there is obtained a preparation which also has good storage stability and redispersibility as well as a good migration rating of 4.

EXAMPLE 3

22.8 parts of the dry dye of the formula

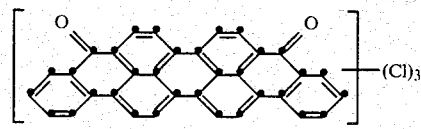

are intensively stirred into a mixture of 1.6 parts of an anionic dispersant (condensate of formaldehyde with the sodium salt of naphthalenesulfonic acid), 30 parts of a 43% aqueous solution of a telomer of sodium hypophosphite and acrylic acid (mol. wt. about 1000), 0.4 part of formaldehyde in the form of a 37% aqueous solution, 18 parts of glycerol and 27.2 parts of water, and the mixture is homogenised for about 20 minutes at room temperature. The resultant dye suspension is then ground in an open mill for 17 hours with 200 parts of siliquarzite balls (diameter: 3 mm) until the dye has an average particle size of about 1 μm. After removal of the grinding balls there is obtained a liquid dyestuff formulation with a good storage stability of 2 months at +40° C., +50° C. and −10° C., and which is readily redispersible.

When using this dyestuff formulation for padding a cotton fabric in a concentration of 40 g/l of padding liquor with the addition of 5 g/l of sodium chloride and 2 ml/l of 80% acetic acid, a migration rating of 4–5 is obtained in the migration test after an intermediate drying.

EXAMPLE 4

27.3 parts of the dry disperse dye of the formula

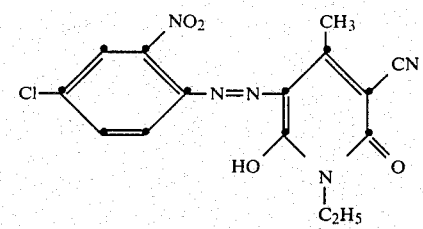

are intensively stirred into a mixture of 5 parts of an anionic dispersant (condensate of formaldehyde with the sodium salt of naphthalenesulfonic acid and bis-chloromethyl diphenyl), 25 parts of a 43% aqueous solution of a telomer of sodium hypophosphite and acrylic acid (mol. wt. about 1000), 0.4 part of formaldehyde in the form of a 37% aqueous solution, 20 parts of glycerol and 22.3 parts of water, and the mixture is homogenised for about 20 minutes at room temperature. The resultant dye suspension is then ground in an open mill for 40 hours with 200 parts of siliquarzite balls (diameter: 3 mm) until the dye has an average particle size of about 1 μm. After removal of the grinding balls there is obtained a liquid dyestuff formulation with good storage stability (1 month at +40° C., +50° C. and −10° C.) and which is readily redispersible. When this dyestuff formulation is applied, as prescribed in the migration test, to a polyester/cotton (67:33) fabric in a concentration of 40 g/l of padding liquor with the addition of 20 g/l of Glauber's salt and 2 ml/l of 80% acetic acid, the levelly dyed fabric has a migration rating of 3-4 after the intermediate drying (2 minutes at 100° C.).

EXAMPLE 5

19.0 parts of the dry dye of the formula

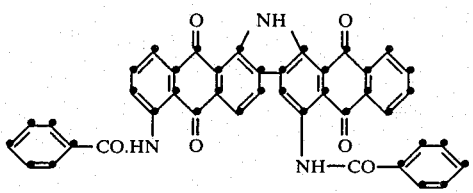

are slowly and intensively stirred into 35.9 parts of water containing 1.7 parts of an oxylignosulfonate (0.2 sulfonate groups per coniferyl alcohol unit, mol. wt. <40,000), 25 parts of a 40% aqueous solution of a telomer of sodium hypophosphite and methacrylic acid (mol. wt. about 4000), 0.4 part of formaldehyde in the form of a 37% aqueous solution and 18 parts of glycerol, and the mixture is homogenised for about 20 minutes at room temperature. The resultant dye suspension is ground in an open mill for 16 hours with 200 parts of siliquarzite balls (diameter: 3 mm) until the dye has an average particle size of about 1 μm. After removal of the grinding balls there is obtained a liquid dyestuff formulation which has good storage stability and redispersibility and a good migration rating of 4.

EXAMPLE 6

19.0 parts of the same dye as in Example 5 are slowly and intensively stirred into 32.9 parts of water containing 1.7 parts of an oxylignosulfonate (0.2 sulfonate groups per coniferyl alcohol unit, mol. wt. <40,000), 26 parts of a 46% aqueous solution of a telomer of sodium hypophosphite and maleic acid (mol. wt. about 1000), 0.4 part of formaldehyde in the form of a 37% aqueous solution and 20 parts of glycerol, and the mixture is homogenised for about 20 minutes at room temperature. The resultant dye suspension is ground in an open mill for 16 hours with 200 parts of siliquarzite balls (diameter: 3 mm) until the dye has an average particle size of about 1 μm. After removal of the grinding balls there is obtained a liquid dyestuff formulation which also has good storage stability and redispersibility and also a good migration rating of 4.

What is claimed is:

1. An aqueous dyestuff formulation comprising at least one water-insoluble or sparingly water-soluble dye, an anionic dispersant, as well as optionally further ingredients, which formulation contains at least one telomer of the formula I

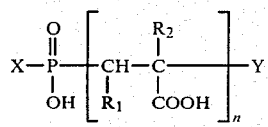

or a salt thereof, wherein X is hydrogen or

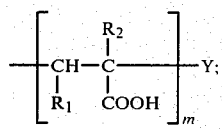

Y is hydrogen, —SO$_4$H or

each of R$_1$ and R$_2$ independently of the other is hydrogen, C$_1$-C$_4$ alkyl which is unsubstituted or substituted by a carboxyl group or is carboxyl; and the sum of n+m is an integer from 2 to 350.

2. An aqueous dyestuff formulation of claim 1 which contains a telomer of the formula I in the form of an alkali metal salt, an ammonium salt or a mono-, di- or tri(hydroxyethyl)ammonium or mono-, di- or tri(hydroxypropyl)ammonium salt.

3. An aqueous dyestuff formulation of claim 1 which contains a telomer of the formula I in a concentration of 0.5 to 30% by weight, based on the final formulation.

4. A process for the preparation of an aqueous dyestuff formulation according to claim 1, which comprises stirring at least one water-insoluble or sparingly water-soluble dye into an aqueous solution containing an anionic dispersant and a telomer of the formula I, homogenizing the mixture at room temperature and subsequently grinding the resultant dispersion until the particle size of the dye is smaller than 10 μm, optionally with the addition of further ingredients to the formulation before or after the grinding procedure.

5. Cellulosic, polyester or polyester/cotton textile material dyed with an aqueous dyestuff formulation of claim 1.

6. An aqueous dyestuff formulation according to claim 1 which contains a telomer of the formula I in a concentration of 10 to 20% by weight, based on the final formulation.

7. A process of claim 4 wherein the particle size is smaller than 2 μm.

8. A method of dyeing textiles which comprises the step of applying to a textile, from a padding liquor, the aqueous dyestuff formulation of claim 1.

* * * * *